US012763562B2

(12) United States Patent
Rogers et al.

(10) Patent No.: US 12,763,562 B2
(45) Date of Patent: Oct. 13, 2026

(54) ELECTRICAL RACEWAY INSTALLATION

(71) Applicant: The Boeing Company, Arlington, VA (US)

(72) Inventors: Ryan Patrick Rogers, Woodinville, WA (US); Shawn David Mohlman, Mill Creek, WA (US); Emily Przybelinski, Shoreline, WA (US)

(73) Assignee: The Boeing Company, Arlington, VA (US)

( * ) Notice: Subject to any disclaimer, the term of this patent is extended or adjusted under 35 U.S.C. 154(b) by 706 days.

(21) Appl. No.: 18/353,513

(22) Filed: Jul. 17, 2023

(65) Prior Publication Data

US 2025/0030231 A1 Jan. 23, 2025

(51) Int. Cl.
*H02G 3/12* (2006.01)
*H01R 25/16* (2006.01)
*H02G 3/08* (2006.01)

(52) U.S. Cl.
CPC ........... *H02G 3/128* (2013.01); *H01R 25/164* (2013.01); *H02G 3/081* (2013.01); *H02G 3/086* (2013.01)

(58) Field of Classification Search
CPC ........ H02G 3/128; H02G 3/086; H02G 3/081; H02G 3/22; H02G 3/263; H02G 3/30; H02G 3/36; H02G 3/00; H01R 25/164; H01R 25/165; H01R 25/162; H01R 25/161; B64F 5/10; B64C 1/18; B64D 2221/00
USPC ... 174/95, 68.1, 68.3, 73.1, 88 R, 70 C, 100; 248/68.1, 49; 52/220.1, 220.3, 220.5, 52/220.7
See application file for complete search history.

(56) References Cited

U.S. PATENT DOCUMENTS

| | | | | |
|---|---|---|---|---|
| 6,870,102 | B2 * | 3/2005 | Morini | H02G 3/0443 174/68.3 |
| 6,875,916 | B2 * | 4/2005 | Winkelbach | H02G 3/0437 174/95 |
| 8,001,643 | B1 * | 8/2011 | James | H02G 9/04 174/68.1 |
| 8,558,112 | B2 * | 10/2013 | Pawluk | H02G 3/0437 174/72 A |
| 10,096,405 | B2 | 10/2018 | Mohlman et al. | |
| 10,522,990 | B1 * | 12/2019 | Klein | H02G 3/263 |
| 10,644,487 | B1 * | 5/2020 | Strong | H02G 9/04 |
| 11,232,887 | B2 | 1/2022 | Mohlman et al. | |
| 11,362,494 | B2 * | 6/2022 | Kreiger | H02G 3/0425 |
| 12,503,234 | B1 * | 12/2025 | Hesslewood | B64D 11/04 |

* cited by examiner

*Primary Examiner* — Angel R Estrada
(74) *Attorney, Agent, or Firm* — Yee & Associates, P.C.

(57) ABSTRACT

An electrical raceway installation apparatus and method for installing an electrical raceway into a floor grid assembly of an aircraft. The electrical raceway installation apparatus includes a backing for connection to the electrical raceway. Floor grid tooling includes a horizontal beam that supports a floor grid assembly of an aircraft. The horizontal beam has a cutout that provides space under the floor grid assembly for insertion of the backing and electrical raceway. A hoist is connected to the floor grid tooling and lifts the backing and the electrical raceway through the space to a position for attachment with the floor grid assembly of the aircraft.

21 Claims, 15 Drawing Sheets

ELECTRICAL RACEWAY INSTALLATION

BACKGROUND INFORMATION

1. Field

The present disclosure relates generally to installing electrical raceways. More specifically, the present disclosure relates to tooling and sequencing for electrical raceway installation into a pre-assembled structural floor grid assembly thus providing flexibility for the electrical raceway to be installed in an optimized timing within the feeder line build sequence.

2. Background

Vehicles, such as large aircraft, have complex electrical and electromechanical systems distributed throughout the fuselage, hull, and other components of the vehicle. Such electrical and electromechanical systems require many bundles of wire, cables, connectors, and related fittings to connect the various electrical and electromechanical components of the vehicle. Large aircraft may have over 1,000 discreet wire bundles. Often these discrete wire bundles are grouped into assemblies known as electrical raceways. Individual electrical raceways may comprise upwards of 50 wire bundles, exceed 100 feet in length, and weigh hundreds of pounds.

Current electrical raceway installation techniques may require a line of as many as 10 to 20 human installers, each carrying 50-70 pounds on their shoulders as they walk up and down stairways and across temporary flooring to ultimately lower the electrical raceway into place on floor grid tooling between seat tracks positioned on and supported by the floor grid tooling. Floor beams, which run generally perpendicular to the seat tracks, are subsequently positioned over the electrical raceway and the seat tracks and then connected to the seat tracks. Finally, the installers attach the electrical raceway to the floor beams. This technique presents access and ergonomic issues due to the timing of the installation of the electrical raceway while the majority of structural work of the floor grid assembly is still underway.

Therefore, it would be desirable to have a method and apparatus that takes into account at least some of the issues discussed above, as well as other possible issues.

SUMMARY

An illustrative embodiment of the present disclosure provides an electrical raceway installation apparatus which comprises a backing, floor grid tooling, and a hoist. The backing is for connection to an electrical raceway, the backing has a width and a length. The floor grid tooling comprises a horizontal beam that supports a floor grid assembly of an aircraft. A cutout, sized to accept the width of the backing, is present in the horizontal beam. The cutout provides a space under the floor grid assembly. A hoist is connected to the floor grid tooling. The hoist lifts the backing and the electrical raceway vertically through the space to a position for attachment with the floor grid assembly.

Another illustrative embodiment of the present disclosure provides a system for installing an electrical raceway into a floor grid assembly of an aircraft. A floor beam is connected to a set of seat tracks to form the floor grid assembly. Floor grid tooling which has a horizontal beam supports the floor grid assembly. A backing is connected to the electrical raceway. A cutout in the horizontal beam is sized to accommodate the backing, while the backing is loaded into the floor grid tooling through the cutout. A hoist is connected to the floor grid tooling and is positioned within the cutout, the hoist comprises a roller for engagement with the backing.

A further illustrative embodiment of the present disclosure provides a method for installing an electrical raceway into a floor grid assembly of an aircraft. A set of seat tracks and a set of floor beams is loaded on a floor grid tooling to form the floor grid assembly of the aircraft. The floor grid tooling includes a cutout under each floor beam of the set of floor beams. An electrical raceway is connected to a backing, wherein the backing has a length and a width. The backing is loaded lengthwise into the floor grid tooling under the floor grid assembly of the aircraft through the cutout under a first floor beam of the set of floor beams. The backing and connected electrical raceway are lifted into a position for attachment with the floor grid assembly of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that baseline practices of electrical raceway installation install the electrical raceway before the assembly of the floor grid is complete.

The illustrative embodiments also recognize and take into account that baseline practices of electrical raceway installation install the electrical raceway from above the partially assembled floor grid and that elevating the electrical raceway to the installation position presents transportation and maneuvering challenges.

The illustrative embodiments also recognize and take into account that installing the electrical raceway from above during the assembly of the floor grid instead of after the floor grid assembly is complete presents access above the raceways and ergonomic issues such as tripping hazards and head strike hazards.

Thus, the illustrative embodiments provide an electrical raceway installation apparatus and procedure that supports the electrical raceway for transportation to the already assembled floor grid assembly and lifts the electrical raceway from below the floor grid assembly into position for attachment with the floor grid assembly.

Figure 1:
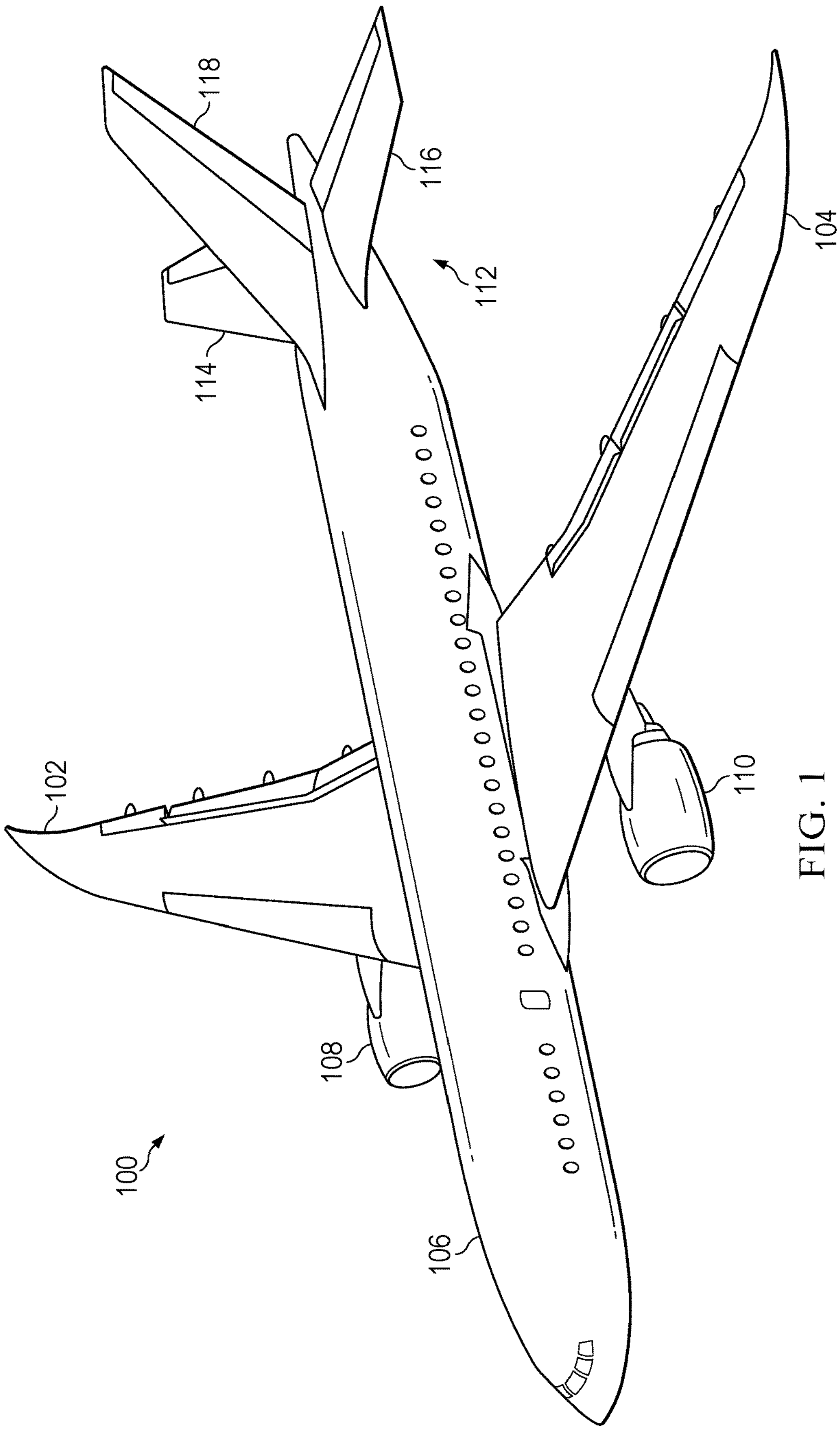
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft in which an electrical raceway installation apparatus or system may be implemented in accordance with an illustrative example. For example, a passenger cabin area located in fuselage 106 of aircraft 100 will have a floor grid assembly and connected electrical raceway which may be assembled with the aid of an electrical raceway installation apparatus.

The illustration of aircraft 100 in FIG. 1 is not meant to imply physical or architectural limitations to the manner in which an illustrative example may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples for an illustrative example are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where installation of electrical raceways is desirable.

Figure 2:
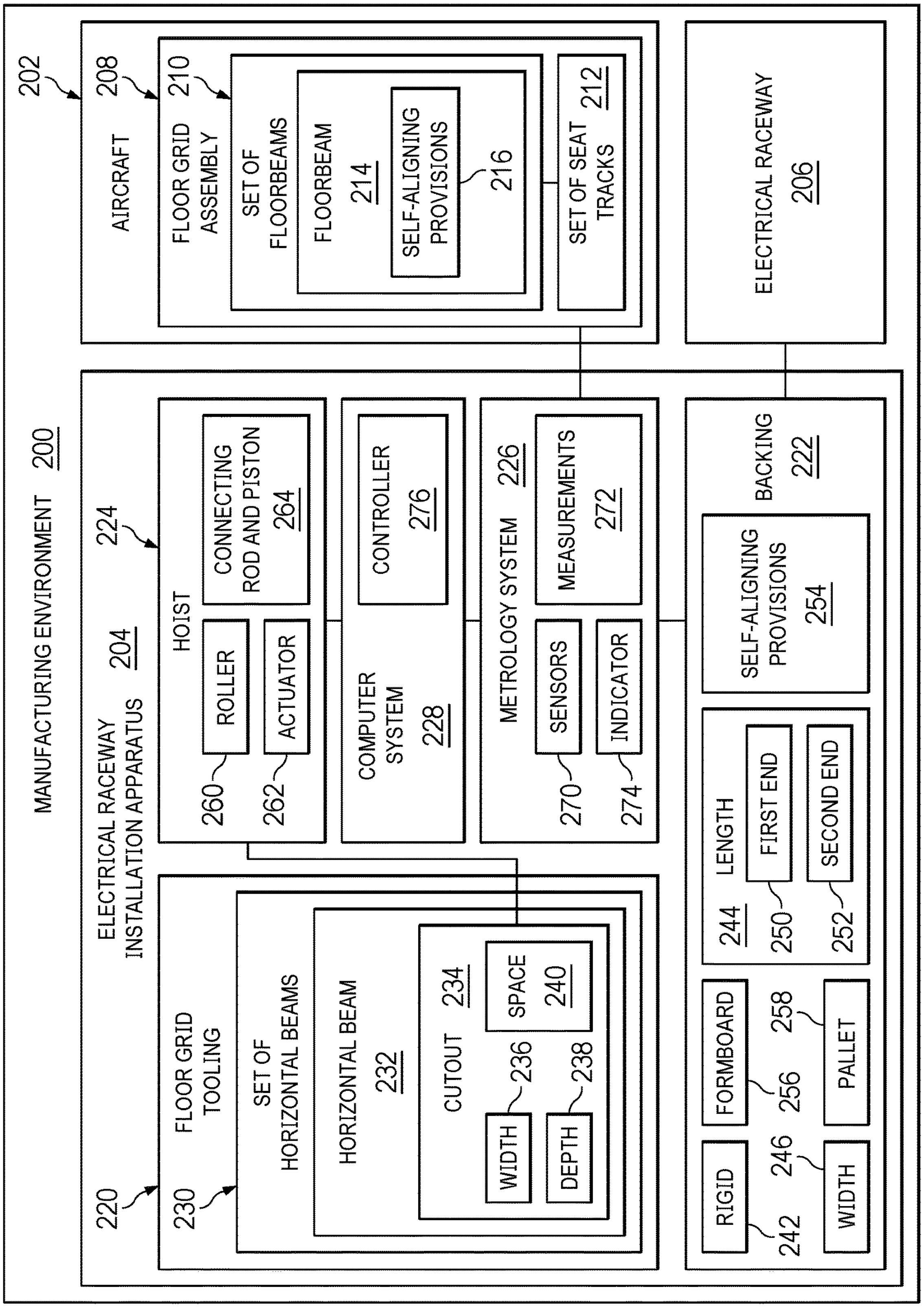
FIG. 2 is an illustration of a block diagram of a manufacturing environment in accordance with an illustrative embodiment.

Turning now to FIG. 2, an illustration of a block diagram of an aircraft manufacturing environment is depicted in accordance with an illustrative example. Aircraft manufacturing environment 200 includes aircraft 202, electrical raceway installation apparatus 204, and electrical raceway 206.

In this illustrative example, aircraft 202 includes Floor grid assembly 208. Floor grid assembly 208 is made up of set of floor beams 210 connected to set of seat tracks 212. Set of floor beams 210 includes at least one floor beam 214. Set of floor beams 210 generally run perpendicular to the length of the fuselage while set of seat tracks generally run parallel with the length of the fuselage. As a result, set of floor beams 210 are oriented generally perpendicular with set of seat tracks 212. Each floor beam of set of floor beams 210 may include self-aligning provisions. For example, floor beam 214 includes self-aligning provisions 216. As a non-limiting example, self-aligning provisions 216 may be quick connect clips designed to fasten themselves with reciprocal self-aligning provisions when brought together. Self-aligning provisions 216 mate with self-aligning provisions found on the backing that is connected to electrical raceway 206 that is to be installed within floor grid assembly 208.

As used herein, a "set of," when used with reference to items, means one or more items. For example, a "set of floor beams" is one or more of floor beam 214.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, electrical raceway installation apparatus 204 includes floor grid tooling 220, backing 222, and hoist 224. Optionally, electrical raceway installation apparatus 204 may also include metrology system 226 and computer system 228.

Generally, floor grid tooling is structure comprising vertical and horizontal supports bolstered with bases and braces set up on a manufacturing floor designed to support, for example, aircraft parts while they are being assembled. In this illustrative example, floor grid tooling 220 is designed for supporting floor grid assembly 208 during assembly of floor grid assembly 208 and while electrical raceway 206 is transported to floor grid assembly 208 and subsequently installed into floor grid assembly 208. The illustrative examples of this disclosure provide an advantage over the current electrical raceway installation procedures by connecting the electrical raceway to the floor grid assembly only after the floor beams and the seat tracks of the floor grid assembly are connected together. Further advantages include raising the electrical raceway up into the assembly floor grid assembly rather than requiring a crane or team of installers to lift the electrical raceway over a partially assembled floor grid assembly and lowering the electrical raceway into position within the floor grid assembly.

Accordingly, in this illustrative example, floor grid tooling 220 includes set of horizontal beams 230. In practice, each horizontal beam of set of horizontal beams 230 may be supported by a pair of vertical supports and various bases and braces. Each horizontal beam of set of horizontal beams 230 is generally evenly spaced from each other and aligned parallel to provide a uniform surface for supporting floor grid assembly 208.

Set of horizontal beams 230 includes at least one horizontal beam 232. Horizontal beam 232 includes cutout 234. Cutout 234 is generally U-shaped and has width 236 and depth 238. Width 236 is sized to accommodate the width of the backing that supports the electrical raceway to be installed. Depth 238 is sized to accommodate the thickness of the backing and account for disconnect brackets and the height of coiled wires of the electrical raceway. The U-shape of cutout 234 also defines space 240. Width 236 and depth 238 of cutout 234 define space 240. Each horizontal beam of set of horizontal beams 230 includes a cutout resulting in a plurality of cutouts which are aligned and evenly spaced.

In this illustrative example, backing 222 is generally rigid 242. Backing 222 has a rigidity that provides support for electrical raceway 206. Electrical raceway 206 is assembled on backing 222. Electrical raceway 206 is connected to backing 222. Electrical raceway 206, while connected to backing 222, is transported to an assembled floor grid assembly via known methods such as walked by installers, rolled on a cart, or advanced on an assembly line.

Backing 222 has length 244 and width 246. Length 244 is larger than width 246 resulting in a high aspect ratio. Length 244 of backing 222 has first end 250 and second end 252. Backing 222 includes self-aligning provisions 254. Self-aligning provisions 254 are designed to mate with self-aligning provisions 216 of floor grid assembly 208.

Backing 222 may be formboard 256 or pallet 258. When backing is formboard 256, backing is non-flyaway. In other words, the connection between electrical raceway 206 and formboard 256 is temporary and once electrical raceway is connected to floor grid assembly 208, formboard 256 is removed. Formboard 256 is a non-flyaway assembly and transportation aid that may be recycled and reused to assemble and transport another electrical raceway. In contrast, backing 222 may be pallet 258. When palletized, backing 222 is able to accommodate alternative electrical raceway configurations. Pallet 258 is a fly-away component and thus remains with the assembled floor grid assembly after being connected to the floor grid assembly and is delivered with the completed aircraft to a client.

Hoist 224 is connected to floor grid tooling 220 within cutout 234. Hoist 224 includes roller 260. Roller 260 engages backing 222. Hoist 224 may include actuator 262. Actuator 262 is configured to reposition roller 260 vertically through space 240. Actuator 262, for example, may be a pneumatic, hydraulic, or electrical actuator. Alternatively, hoist 224 may include connecting rod and piston 264. Connecting rod and piston 264 is configured to reposition roller 260 vertically and horizontally through space 240.

Each cutout of each horizontal beam of set of horizontal beams 230 may include a hoist resulting in a plurality of hoists evenly spaced within floor grid tooling 220. The plurality of evenly spaced hoists can support length 244 of backing 222.

Electrical raceway installation apparatus 204 may include metrology system 226 and computer system 228.

In this illustrative example, metrology system 226 is a hardware sensor system. Metrology system 226 includes sensors 270 which take measurements 272 of the positions in three independent axes, for example, inboard/outboard, fore/aft, and/or up/down of backing 222 and floor grid assembly 208 relative to each other. As depicted, measurements 272 are made without contact or touching backing 222 and/or floor grid assembly 208. Measurements 272 are repeatedly taken by metrology system 226 as backing 222 with the connected electrical raceway 206 is moved into a position for attachment with floor grid assembly 208. Movement of backing 222 relative to floor grid assembly 208 can be made by hand or through automation with actuators and motors, etc. Metrology system 226 includes indicator 274. In non-limiting examples, indicator 274 may be lights that turn on and off or change color to indicate proper positioning. Indicator 274 may be a display screen showing relative positions of backing 222 and floor grid assembly 208. Through the use of metrology system 226 taking measurements 272 and indicating relative positions of backing 222 and floor grid assembly 208, backing 222 can be directed to the proper position for attachment with floor grid assembly 208. Movement of backing 222 to the proper position for attachment with floor grid assembly 208 can be made by hand or automatically.

In the illustrative example, controller 276 controls metrology system 226 and movement of backing 222 if movement of backing 222 is automated. If movement of backing 222 is automated based on measurements received from metrology system 226, controller 276 sends movement commands to actuators/motors based on measurements 272. Controller 276 may be implemented in software, hardware, firmware or a combination thereof. When software is used, the operations performed by controller 276 may be implemented in program code configured to run on hardware, such as a processor unit. When firmware is used, the operations performed by controller 276 may be implemented in program code and data and stored in persistent memory to run on a processor unit. When hardware is employed, the hardware may include circuits that operate to perform the operations in controller 276.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, controller 276 is located in computer system 228. Computer system 228 includes one or more data processing systems. When more than one data processing system is present, those data processing systems may be in communication with each other using a communications medium such as a network. The data processing systems may be selected from at least one of a computer, a server computer, a tablet, a mobile phone, or some other suitable data processing system.

As depicted in this illustrative example, controller 276 receives measurements 272 from metrology system 226. Controller 276 identifies movements needed to position backing 222 for attachment with floor grid assembly 208. Indicator 274 indicates what direction (inboard/outboard, fore/aft, and/or up/down) movements are necessary to position the backing for attachment with the floor grid assembly of the aircraft.

Figure 3:
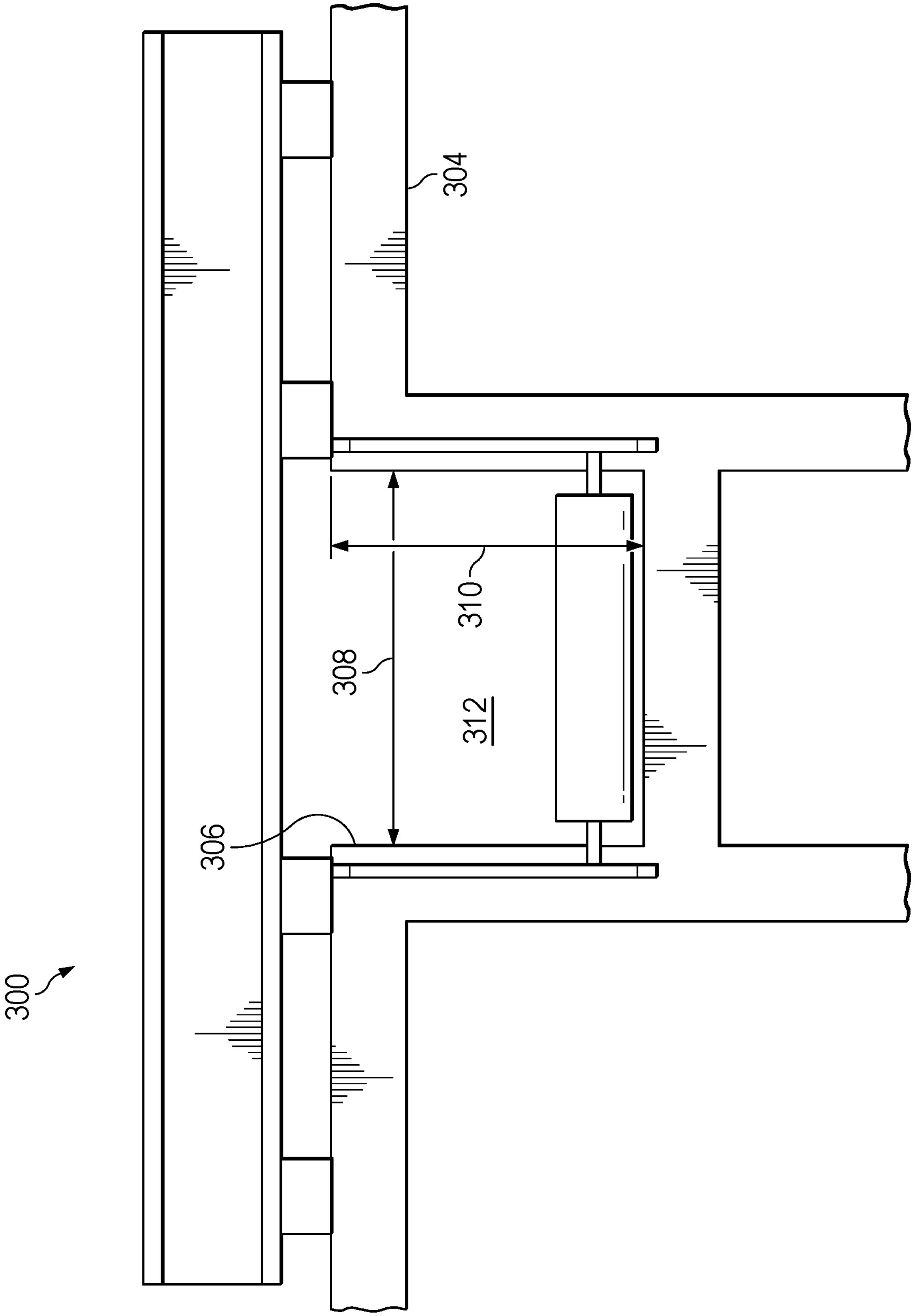
FIG. 3 is an illustration of an end view of floor grid tooling in accordance with an illustrative embodiment.
Figure 4:
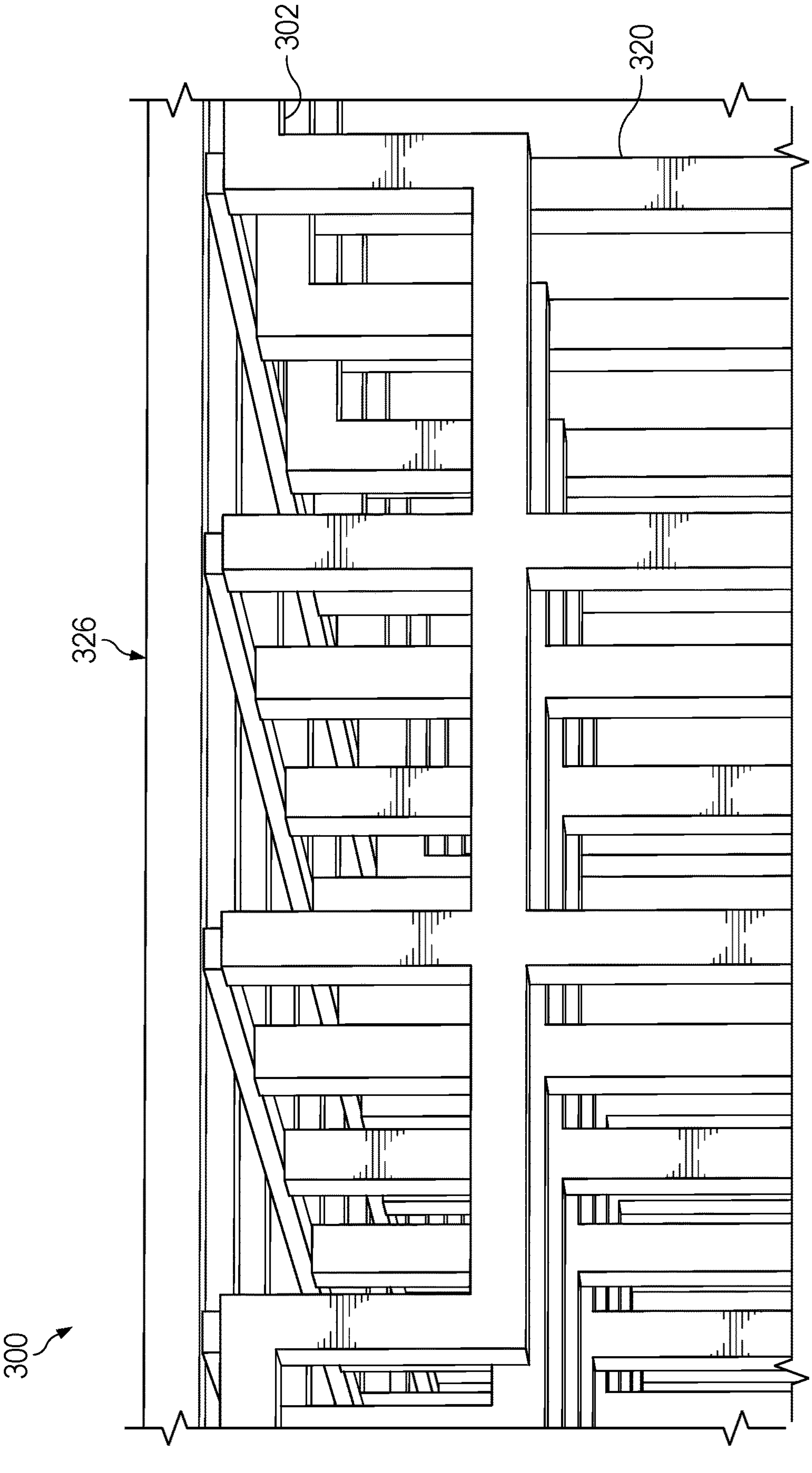
FIG. 4 is an illustration of a perspective view of floor grid tooling in accordance with an illustrative embodiment.

With reference next to FIGS. 3-4, illustrations of floor grid tooling are depicted in accordance with an illustrative embodiment. In this illustrative example and the illustrative examples that follow, the same reference numeral may be used in more than one figure. This reuse of a reference numeral in different figures represents the same element in the different figures. The components illustrated in FIGS. 3-4 are examples of physical implementations of floor grid tooling 220, set of horizontal beams 230, horizontal beam 232, cutout 234 shown in block form in FIG. 2.

As illustrated, floor grid tooling 300 includes set of horizontal beams 302. In practice, each horizontal beam of set of horizontal beams 302 may be supported by vertical supports 320 and various bases and braces. Each horizontal beam of set of horizontal beams 302 is generally evenly spaced from each other and aligned parallel to provide a uniform surface for supporting floor grid assembly 326. Each horizontal beam of set of horizontal beams 302 will include at least one cutout. Each horizontal beam of set of horizontal beams 302 may include more than one cutout arranged side-by-side in a plane.

As illustrated, set of horizontal beams 302 includes at least one horizontal beam 304. Horizontal beam 304 includes cutout 306. Cutout 306 is generally U-shaped and has width 308 and depth 310. Width 308 is sized to accommodate the width of the backing that supports the electrical raceway to be installed. Depth 310 is sized to accommodate the thickness of the backing and account for the height of coiled wires of the electrical raceway. The U-shape of cutout 306 defines space 312. Width 308 and depth 310 of cutout 306 shape space 312. Each horizontal beam of set of horizontal beams 302 includes a cutout resulting in a plurality of cutouts which are aligned and evenly spaced. Cutout 306 may be considered the first cutout in set of horizontal beams 302 of floor grid tooling 300.

Figure 5:
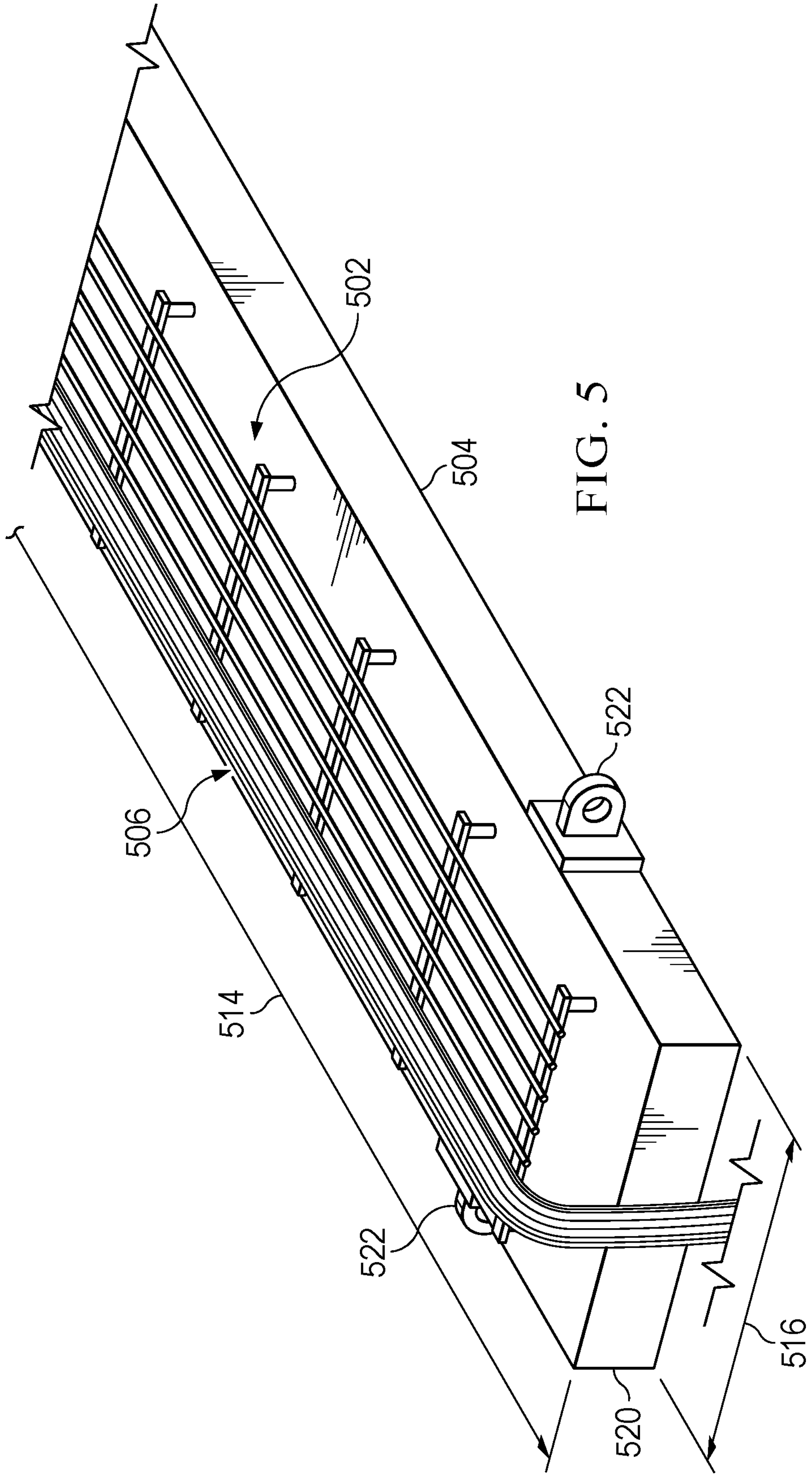
FIG. 5 is an illustration of a perspective view of a backing and an electrical raceway in accordance with an illustrative embodiment.

With reference next to FIG. 5 an illustration of a backing and an electrical raceway connected to the backing is depicted in accordance with an illustrative embodiment.

As illustrated, electrical raceway 502 is connected to backing 504. Electrical raceway 502 is a collection of bundled wires and wiring groups 506 consolidated for supporting systems traversing a particular volume of the aircraft. Electrical raceway 502 will be installed within floor grid assembly 532 after the floor beams 534 are connected to the seat tracks 536.

Backing 504 has a rigidity that provides support for electrical raceway 502. Electrical raceway 502 is assembled on backing 504. Electrical raceway 502 is connected to backing 504. Electrical raceway 502 is transported to an assembled floor grid assembly 532 while connected to and supported by backing 504.

Backing 504 has length 514 and width 516. Length 514 is greater than width 516 resulting in a high aspect ratio. Backing 504 has first end 520 and second end 521. After being transported to the assembled floor grid assembly 532 atop floor grid tooling 300, first end 520 (or the second end) of backing 504 will be inserted into cutout 306 of horizontal beam 304. Backing 504 will proceed to be inserted through all successive cutouts in set of horizontal beams 302 until the entirety of length 514 of backing 504 is supported within floor grid tooling 300. Backing 504 includes self-aligning provisions 522. Self-aligning provisions 522 are designed to mate with self-aligning provisions found on floor beams of the floor grid assembly 532.

Figure 11:
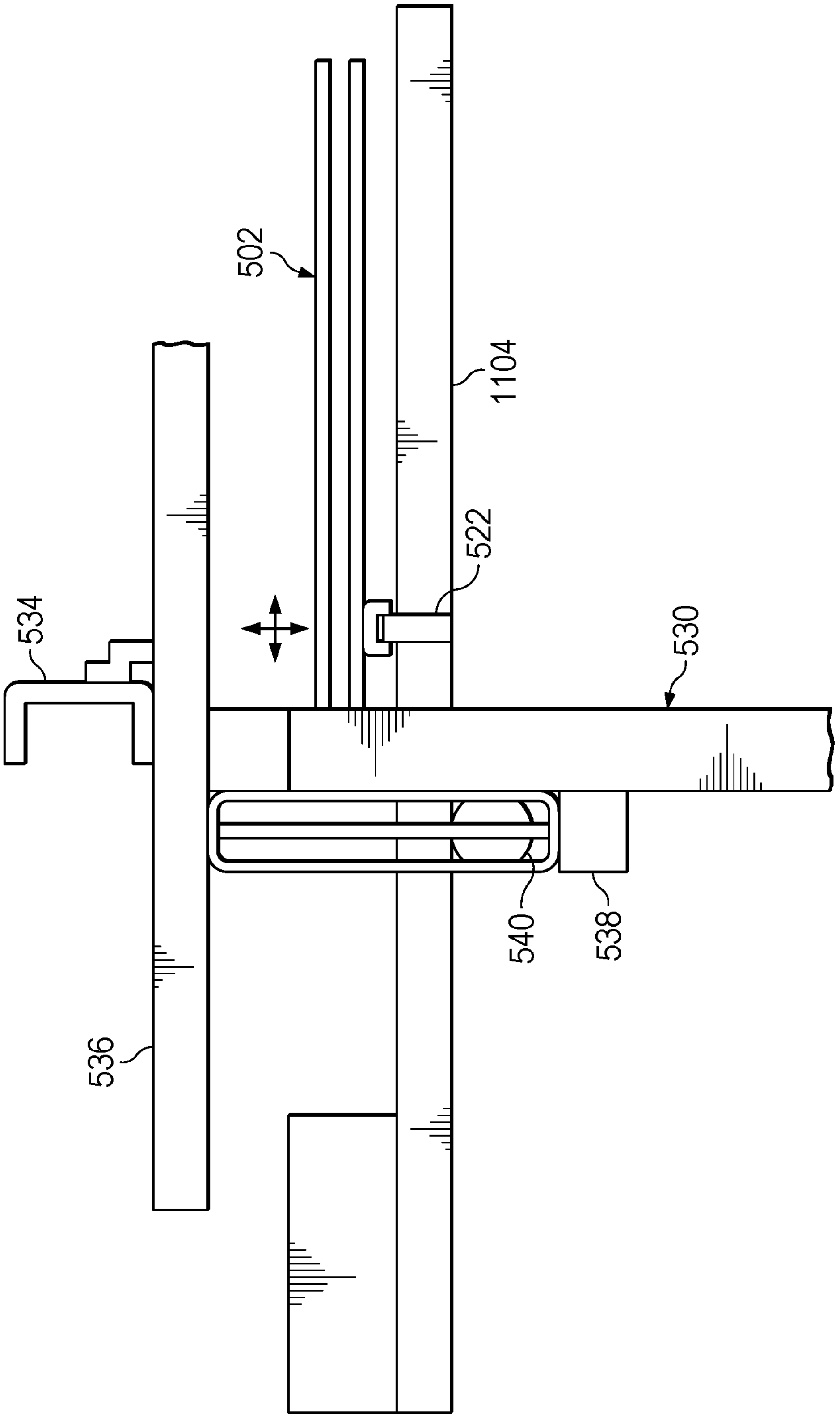
FIG. 11 is an illustration of a side view of a backing and an electrical raceway after to entry into floor grid tooling in accordance with an illustrative embodiment.

Backing 504 may be formboard, as depicted, or palletized (FIG. 11). When backing 504 is formboard, backing 504 is non-flyaway. In other words, the connection between electrical raceway 502 and formboard backing 504 is temporary. Thus, once electrical raceway 502 is connected to a floor grid assembly 532, formboard backing 504 is removed. When palletized, backing 504 can accommodate alternative electrical raceway configurations. When palletized, backing 504 is a fly-away component and thus remains with the assembled floor grid assembly after being connected to the floor grid assembly 532.

With reference next to FIGS. 6-9, illustrations of backing 504 with electrical raceway 502 are depicted in accordance with an illustrative embodiment.

Figure 6:
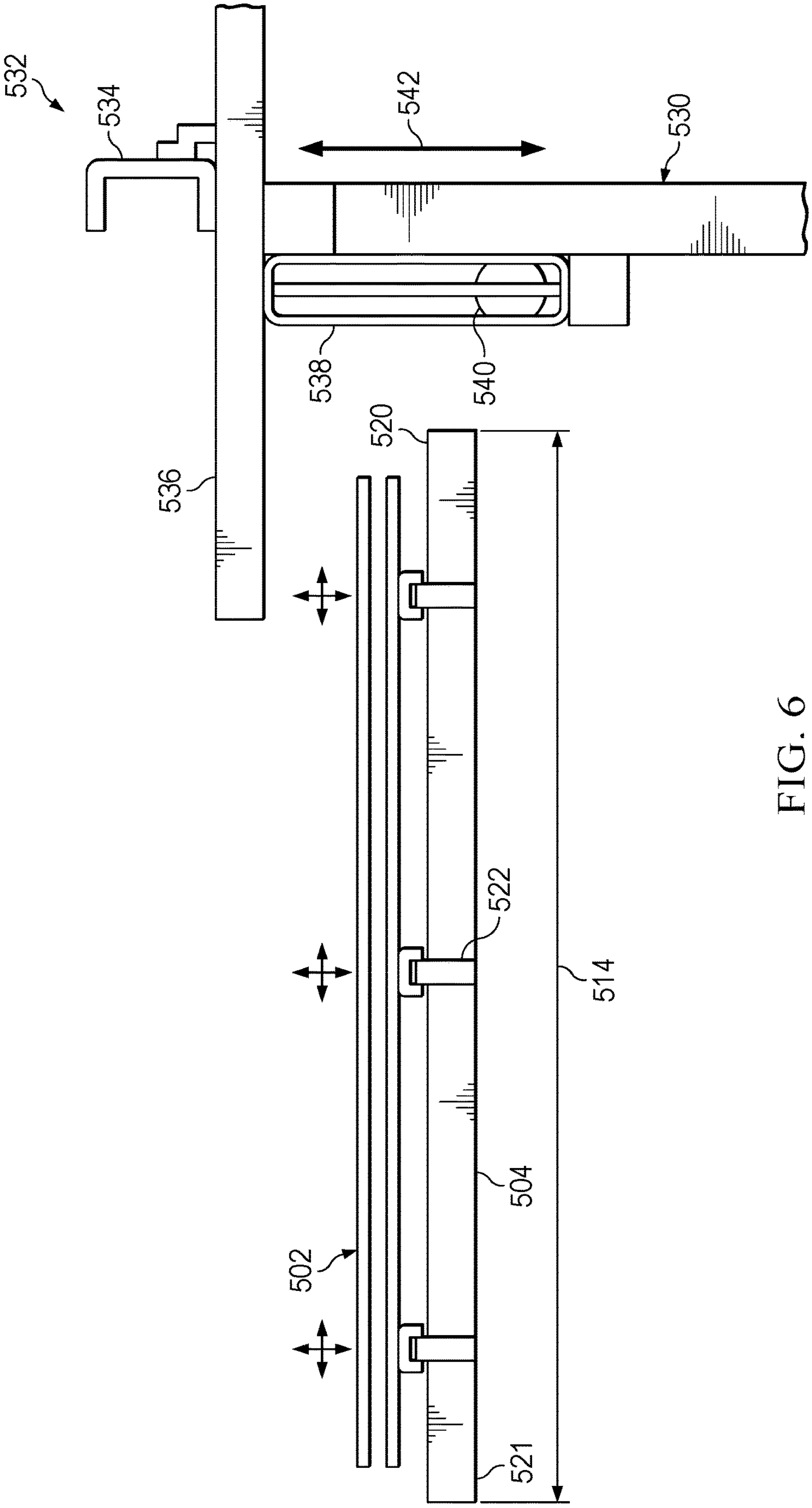
FIG. 6 is an illustration of a side view of a backing and an electrical raceway prior to entry into floor grid tooling in accordance with an illustrative embodiment.

FIG. 6 is an illustration of a side view of backing 504 with electrical raceway 502 attached thereon prior to entry into floor grid tooling 530 in accordance with an illustrative embodiment.

Backing 504 has first end 520 and second end 521 spanning length 514. First end 520 is positioned for insertion into floor grid tooling 530. Floor grid tooling 530 is supporting floor grid assembly 532. Floor grid assembly 532 includes floor beam 534 connected to seat track 536. Floor grid assembly 532 is positioned in an upside-down orientation on floor grid tooling 530. Hoist 538 is connected to floor grid tooling 530. Hoist 538 includes roller 540. Roller 540 is configured to move in direction 542. As roller 540 moves in direction 542, hoist 538 connected to floor grid tooling 530 lifts backing 504 and electrical raceway 502 vertically to a position for attachment with floor grid assembly 532.

Figure 7A:
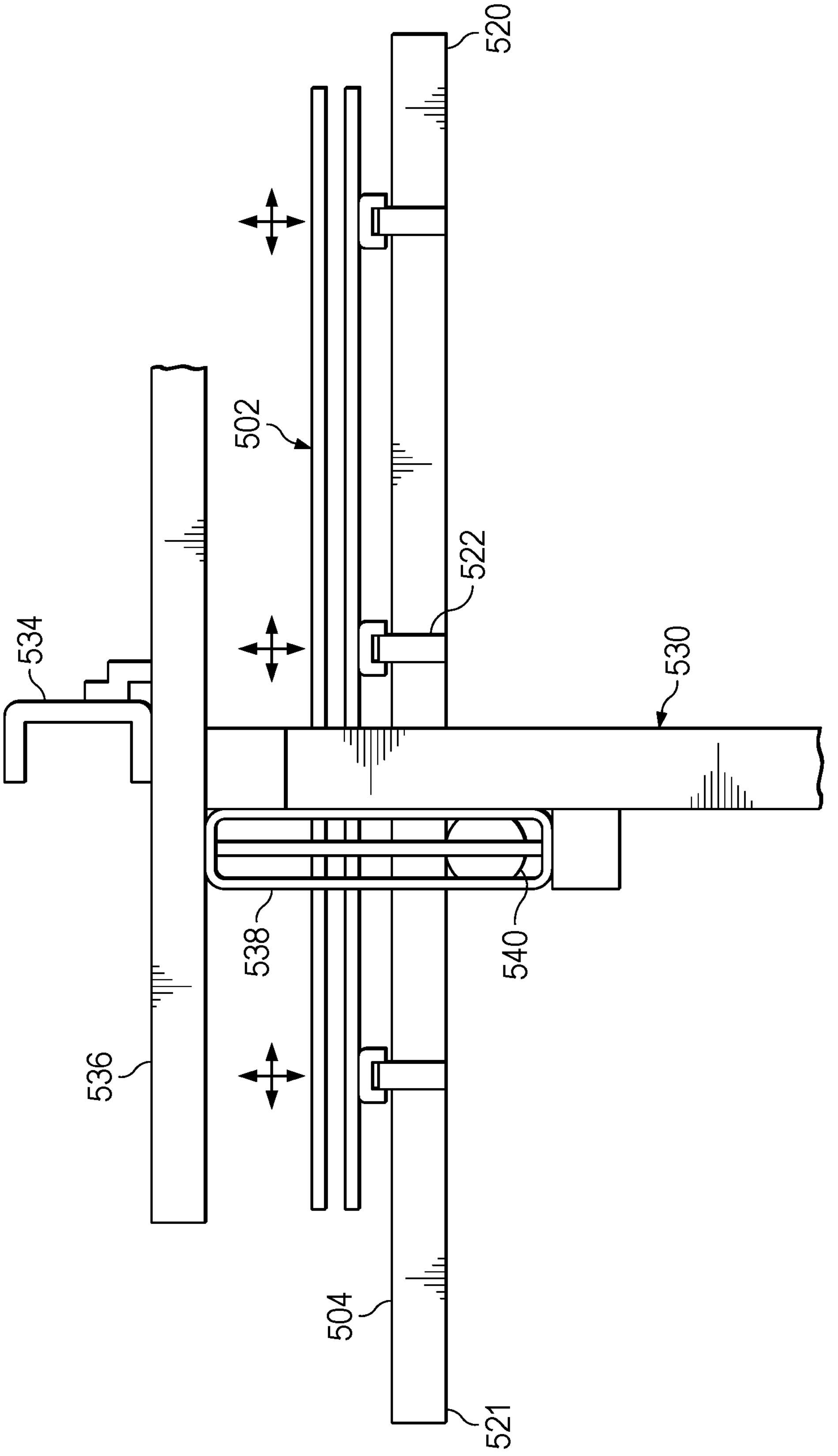
FIG. 7A is an illustration of a side view of a backing and an electrical raceway after entry into floor grid tooling in accordance with an illustrative embodiment.
Figure 7B:
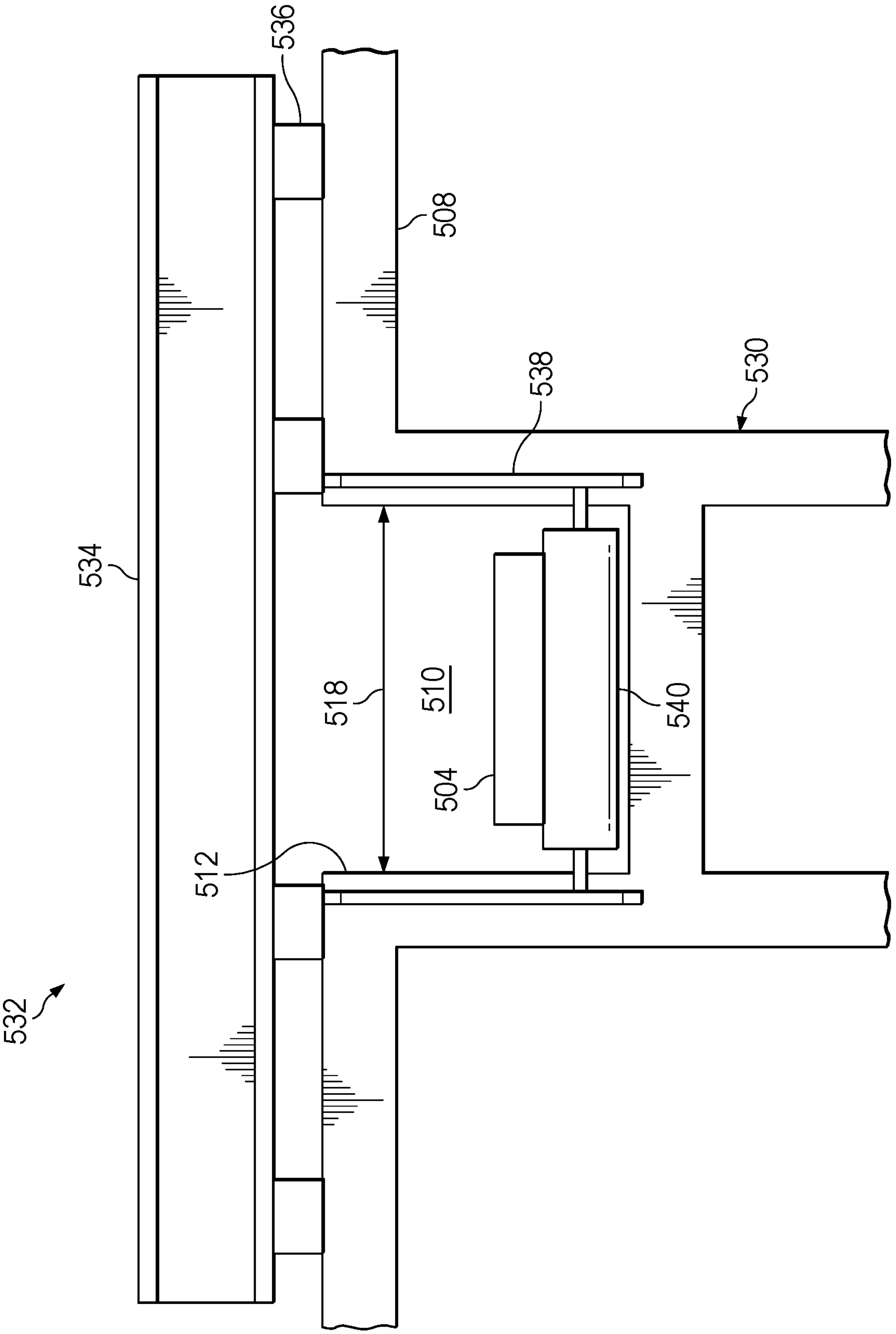
FIG. 7B is an illustration of an end view of a backing and an electrical raceway after entry into floor grid tooling in accordance with an illustrative embodiment.

FIG. 7A is an illustration of a side view of backing 504 with electrical raceway 502 attached thereon after entry into floor grid tooling 530 in accordance with an illustrative embodiment. FIG. 7B is an illustration of an end view of backing 504 with electrical raceway 502 attached thereon after entry into floor grid tooling 530 in accordance with an illustrative embodiment.

Floor grid tooling 530 includes horizontal beam 508. Horizontal beam 508 includes cutout 512. Cutout 512 is U-shaped and defines space 510. Backing 504 with electrical raceway 502 attached thereon is inserted from an end of floor grid tooling into floor grid tooling 530 through space 510. First end 520 of backing 504 enters floor grid tooling 530 through space 510. Cutout 512 has width 518. Width 518 is sized to accommodate width 516 of backing 504. As backing 504 with connected electrical raceway 502 is inserted into floor grid tooling 530 through space 510, backing 504 engages and rolls on roller 540. Roller 540 eases movement of backing 504 through floor grid tooling 530 until the entire length 514 of backing 504 is in position within floor grid tooling 530.

Figure 8A:
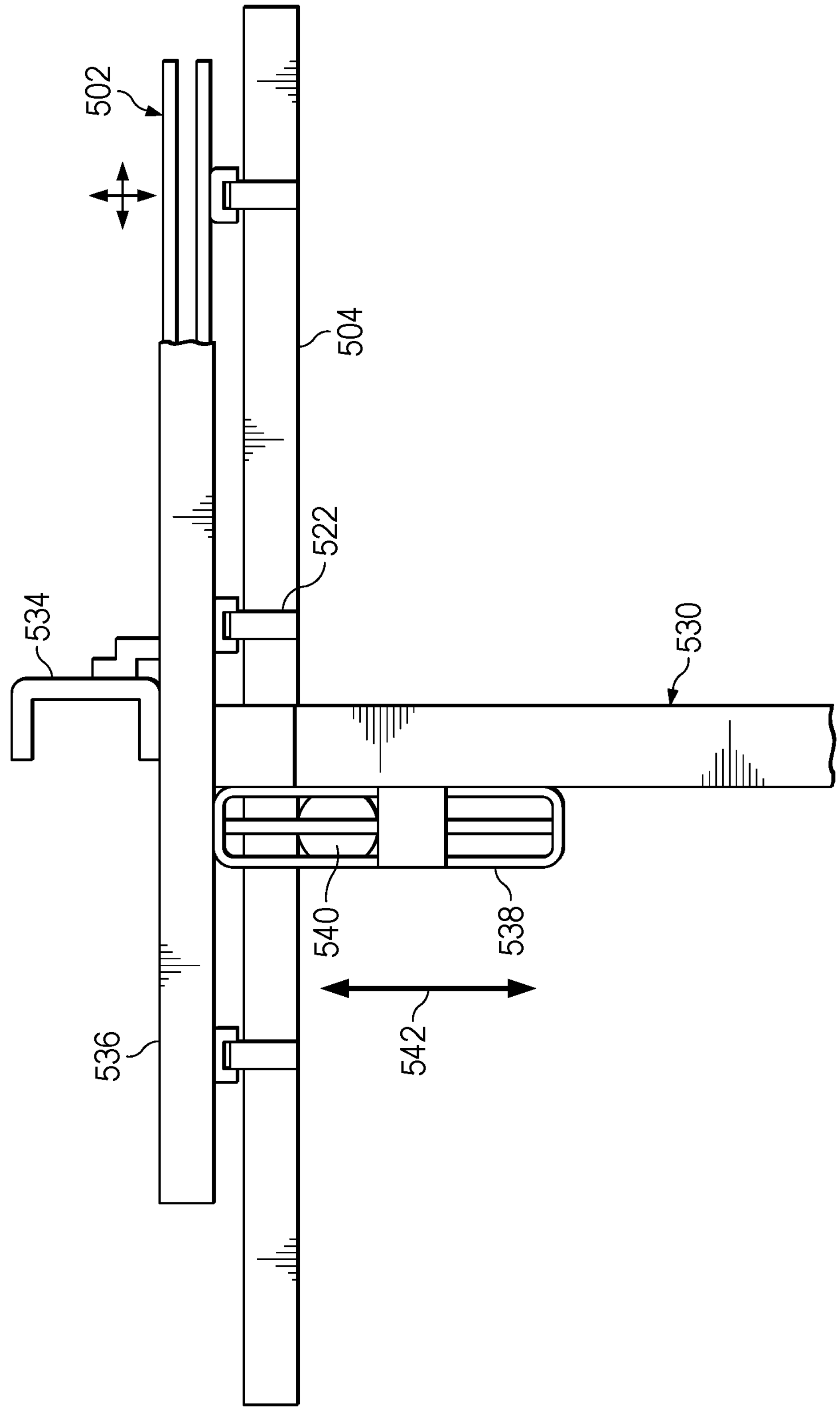
FIG. 8A is an illustration of a side view of a backing and an electrical raceway in a position for attachment with a floor grid assembly in accordance with an illustrative embodiment.
Figure 8B:
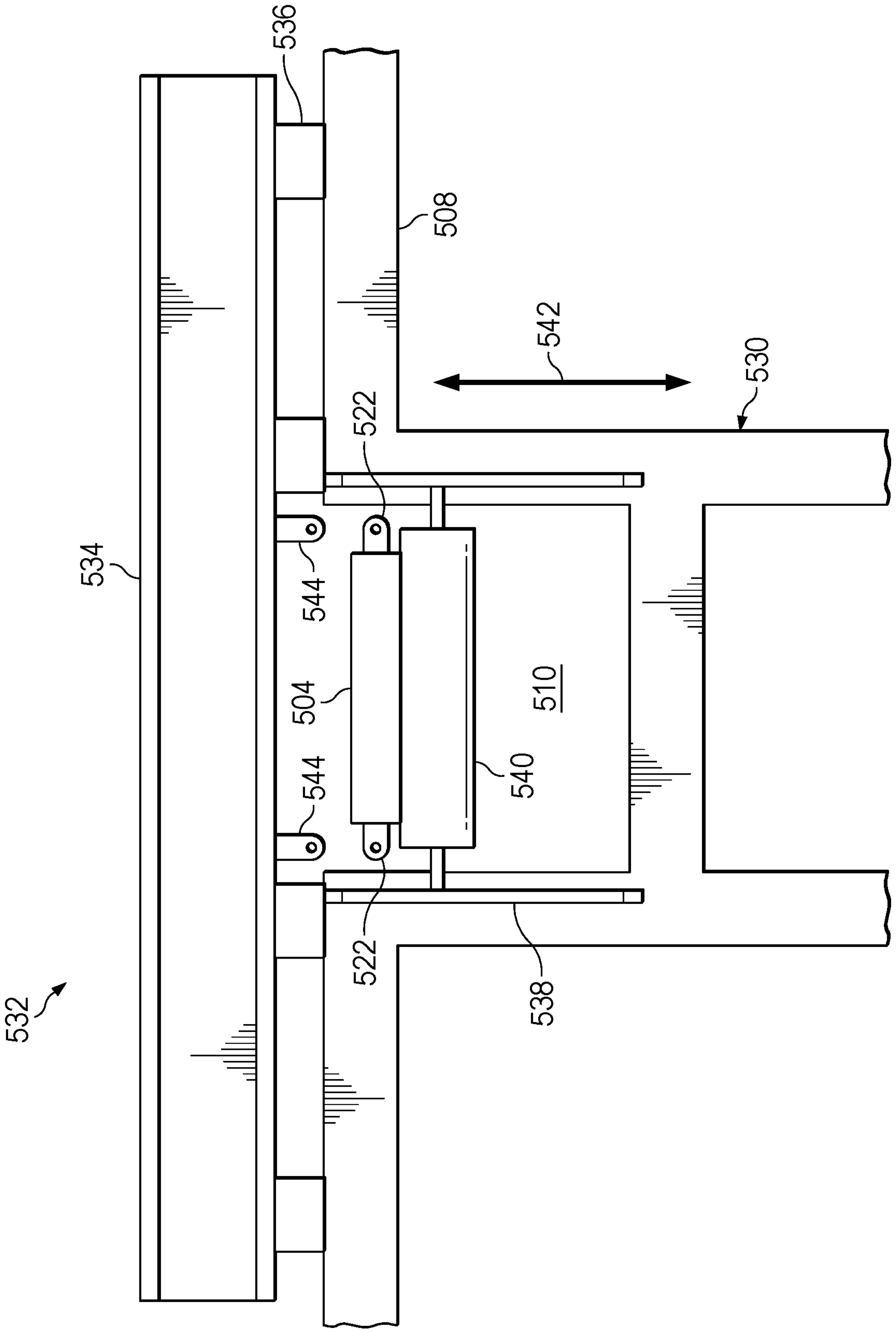
FIG. 8B is an illustration of an end view of a backing and an electrical raceway in a position for attachment with a floor grid assembly in accordance with an illustrative embodiment.

FIG. 8A is an illustration of a side view of backing 504 with electrical raceway 502 raised to a position for attachment with floor grid assembly 532 in accordance with an illustrative embodiment. FIG. 8B is an illustration of an end view of backing 504 with electrical raceway 502 raised to a position for attachment with floor grid assembly 532 in accordance with an illustrative embodiment.

Roller 540 of hoist 538 raises backing 504 and attached electrical raceway 502 to a position for attachment with floor beam 534 of floor grid assembly 532. Roller 540 moves vertically in direction 542 in order to raise backing 504. Backing 504 includes self-aligning provisions 522. Self-aligning provisions 522 mate with self-aligning provisions 544 attached to floor beam 534. Self-aligning provisions 522 located on backing 544 have chamfered or ramped features such that self-aligning features 522 mate with self-aligning provisions 544 located on floor beams 534 within given tolerance, thereby securing backing 504 and electrical raceway 502 in place as electrical raceway 502 is connected to floor grid assembly 532.

Figure 9:
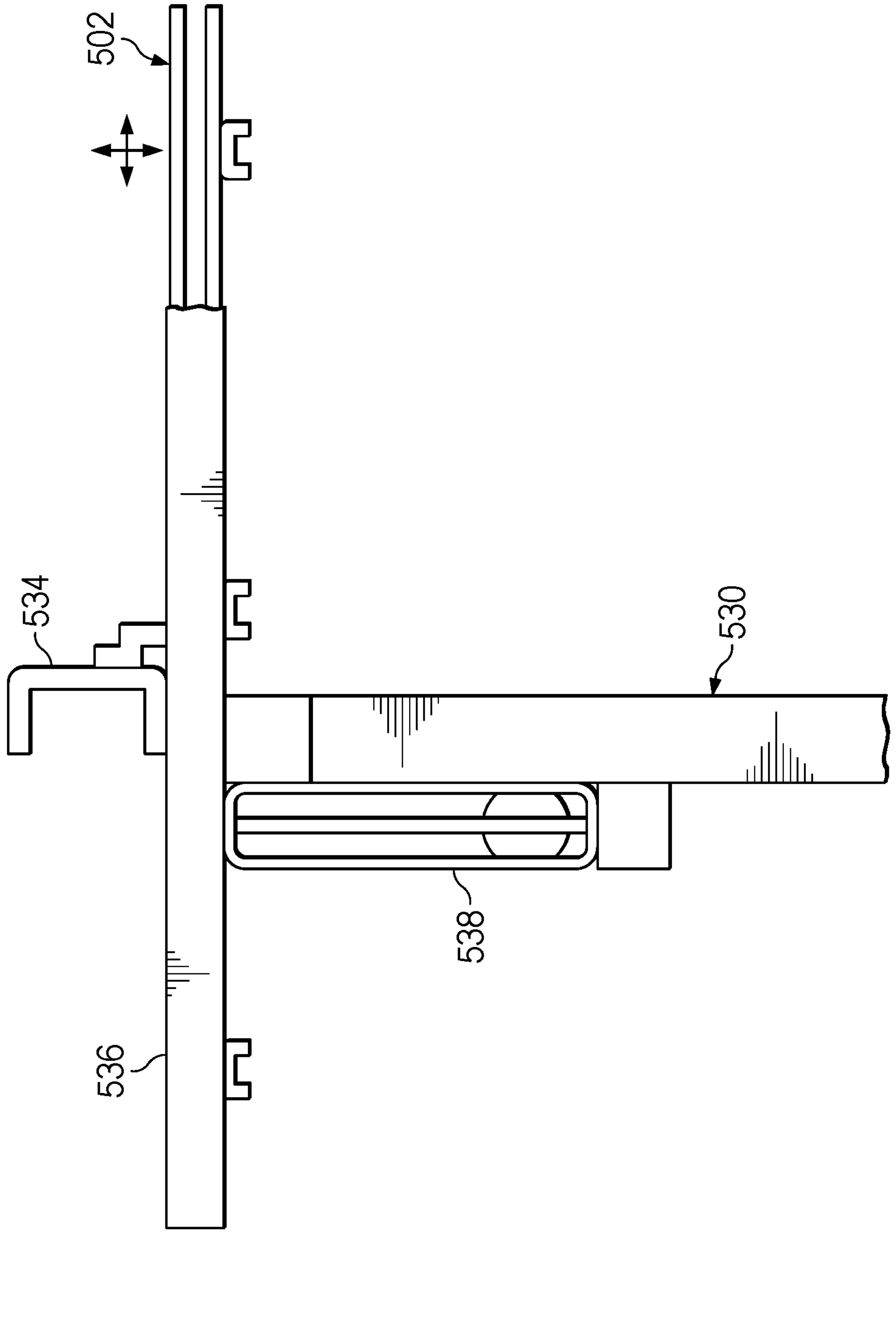
FIG. 9 is an illustration of a side view of an electrical raceway installed connected to a floor grid assembly in accordance with an illustrative embodiment.

FIG. 9 is an illustration of a side view of electrical raceway 502 connected to floor beam 534 in accordance with an illustrative embodiment.

Electrical raceway 502 is connected to floor beam 534. Backing 504 is no longer connected to electrical raceway 502.

Figure 10:
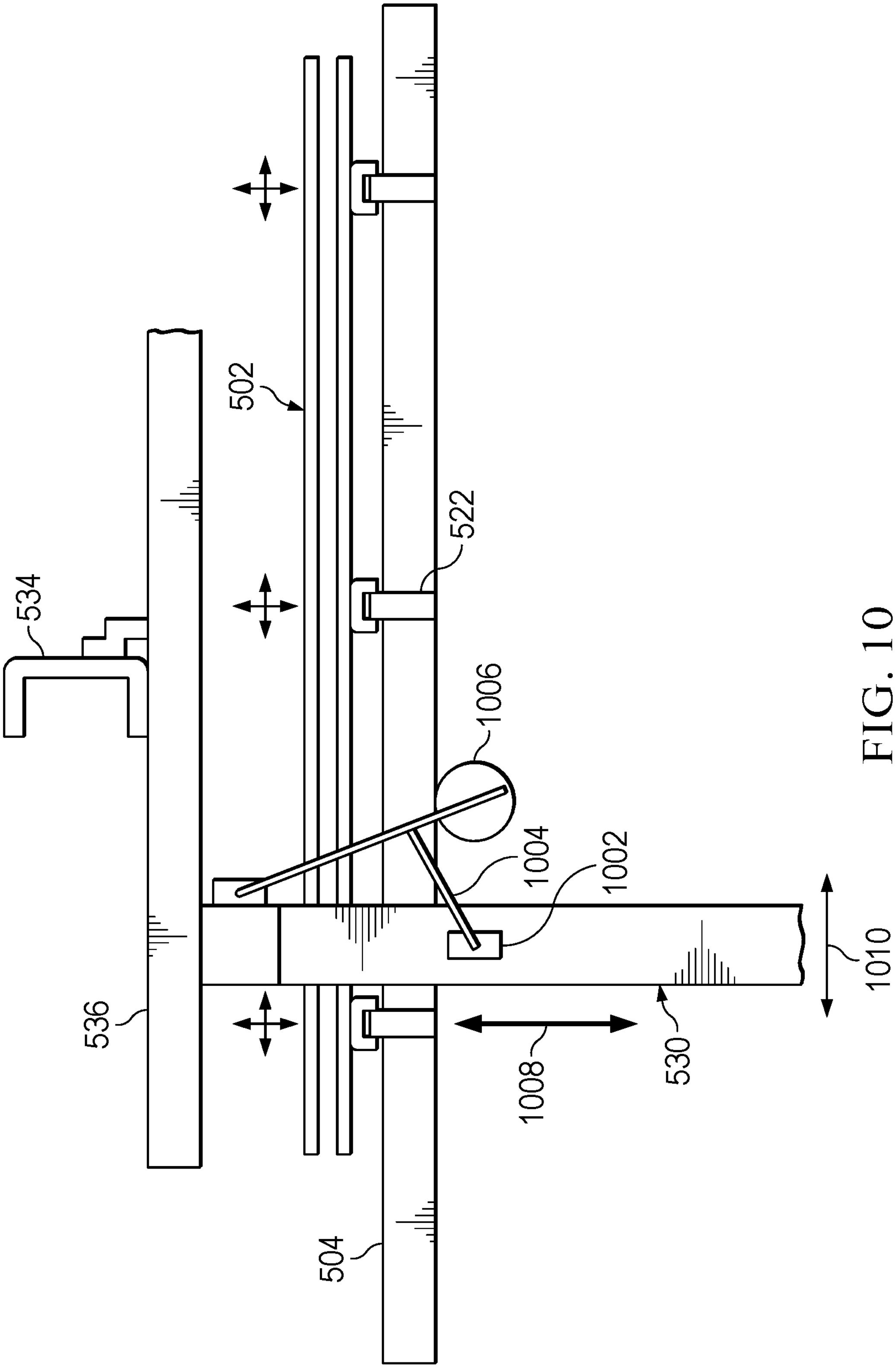
FIG. 10 is an illustration of a side view of a backing and an electrical raceway after to entry into floor grid tooling in accordance with an illustrative embodiment.

With reference next to FIG. 10 an illustration of a side view of backing 504 with electrical raceway 502 attached thereon after entry into floor grid tooling 530 is depicted in accordance with an illustrative embodiment. Hoist 1002 includes connecting rod and piston 1004. Roller 1006 is connected to connecting rod and piston 1004. Hoist 1002 may through the use of connecting rod and piston 1004 can reposition roller 1006 both vertically in direction 1008 and horizontally in direction 1010.

With reference next to FIG. 11 an illustration of a side view of backing 1104 with electrical raceway 502 attached thereon after entry into floor grid tooling 530 is depicted in accordance with an illustrative embodiment. Backing 1104 is palletized. When palletized, backing 1104 is able to accommodate alternative electrical raceway configurations. When palletized, backing 1104 is a fly-away component and thus remains with the assembled floor grid assembly after electrical raceway 502 is connected to the floor grid assembly.

Figure 12:
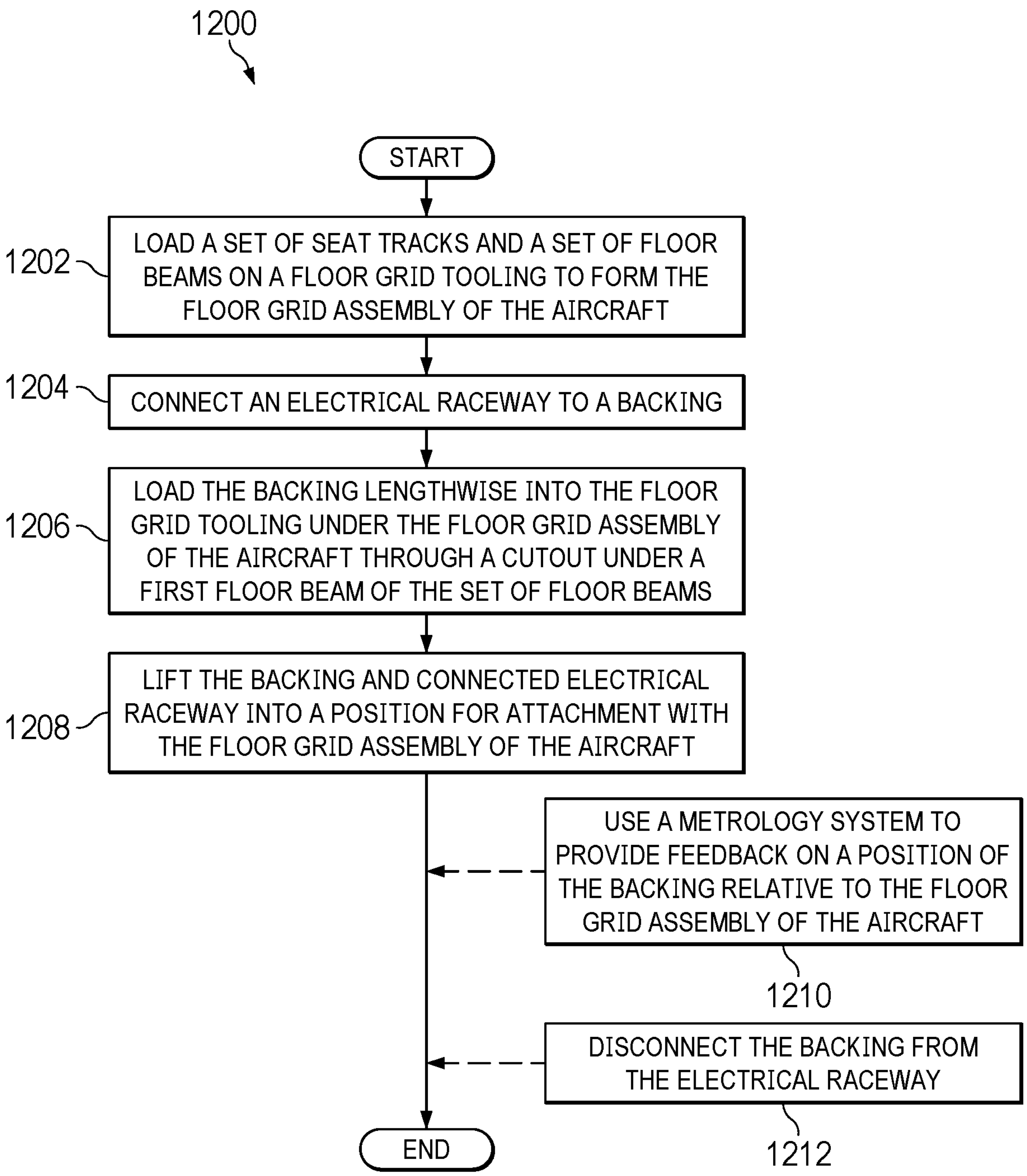
FIG. 12 is an illustration of a flowchart of a process for installing an electrical raceway into a floor grid assembly of an aircraft in accordance with an illustrative embodiment.

With reference next to FIG. 12, an illustration of a flowchart of a process 1200 for installing an electrical raceway into a floor grid assembly of an aircraft is depicted in accordance with an illustrative embodiment. The method depicted in FIG. 12 may be used in conjunction with the electrical raceway installation apparatus depicted in FIGS. 2-11.

The process begins by loading a set of seat tracks and a set of floor beams on a floor grid tooling to form the floor grid assembly of the aircraft (operation 1202). The floor grid tooling includes a cutout under each floor beam of the set of floor beams. The process connects an electrical raceway to a backing (operation 1204). The backing has a length and a width. At operation 1206, the process loads the backing lengthwise into the floor grid tooling under the floor grid assembly of the aircraft through a cutout under a first floor beam of the set of floor beams. At operation 1208, the process lifts the backing and the connected electrical raceway into a position for attachment with the floor grid assembly of the aircraft. At operation 1210, the process uses a metrology system to provide feedback on a position of the backing relative to the floor grid assembly of the aircraft such that self-aligning provisions on the backing can be aligned with self-aligning provisions on the floor grid assembly of the aircraft to ensure that the backing is in the position for attachment with the floor grid assembly of the aircraft. At operation 1212, the process disconnects the backing from the electrical raceway. However, if the backing is a fly-away component, the backing would stay connected to the electrical raceway and remain with the assembled floor grid assembly. Thus, the backing would be delivered with the completed aircraft to a client.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
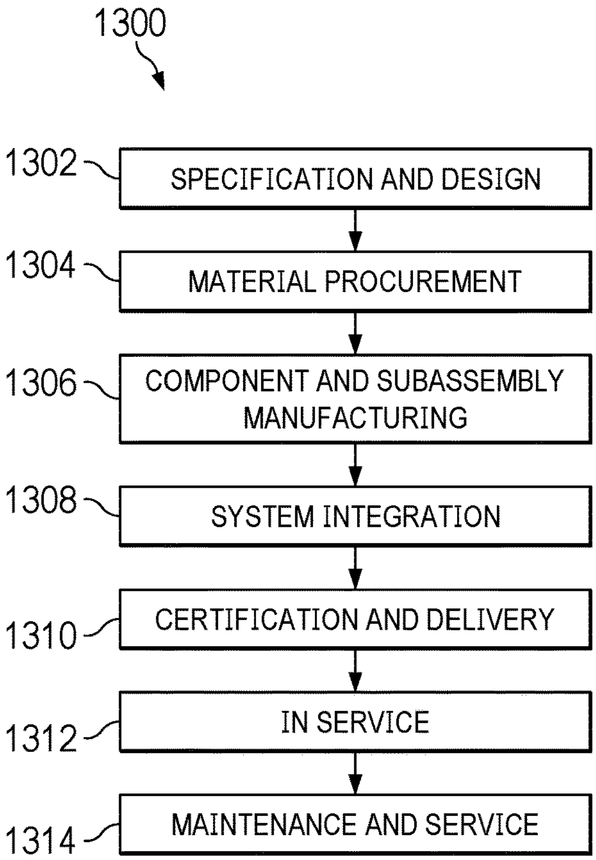
FIG. 13 is an illustration of a block diagram of an aircraft manufacturing and service method in accordance with an illustrative embodiment.
Figure 14:
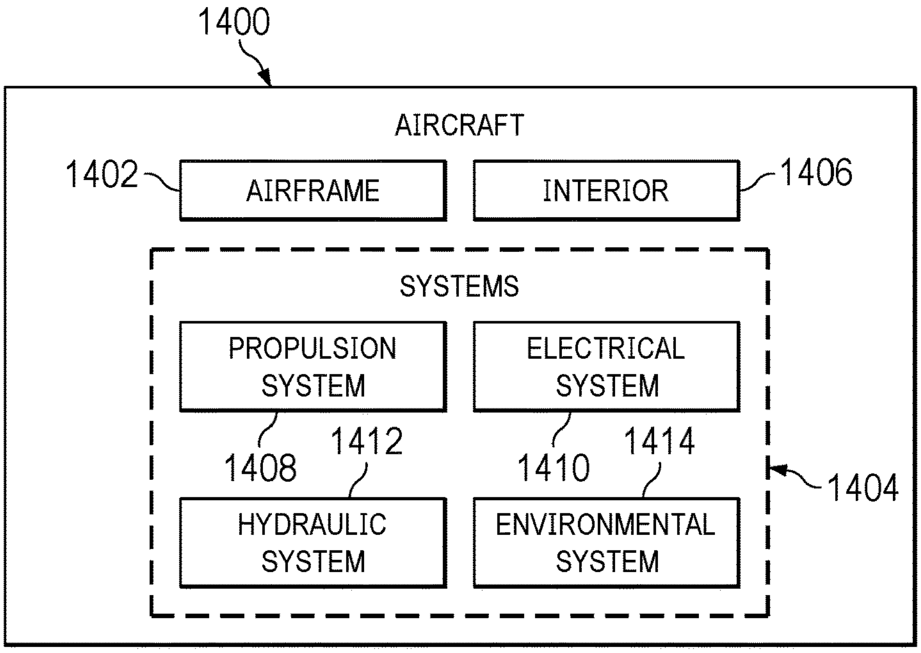
FIG. 14 is an illustration of a block diagram of an aircraft in which an illustrative embodiment may be implemented.

The illustrative embodiments of the disclosure may be further described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance, service, or inspection.

The apparatus of this disclosure may be installed on an aircraft during component and subassembly manufacturing 1306. In addition, the apparatus of this disclosure may be retrofitted onto aircraft 1400 in FIG. 14 during routine maintenance and service 1314 as part of a modification, reconfiguration, or refurbishment of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314, inclusive of inspection, in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electrical raceway installation apparatus, comprising:

a backing for connection to the electrical raceway, the backing having a width and a length;

floor grid tooling comprising a horizontal beam configured to support a floor grid assembly of an aircraft, the horizontal beam comprising a cutout providing a space under the floor grid assembly of the aircraft, the cutout sized to accept the width of the backing; and a hoist connected to the floor grid tooling and configured to lift the backing and the electrical raceway vertically through the space to a position for attachment with the floor grid assembly of the aircraft.

2. The apparatus of claim 1, wherein the hoist is connected to the floor grid tooling in the cutout.

3. The apparatus of claim 1, wherein the hoist includes a roller for contact with the backing.

4. The apparatus of claim 3, wherein the hoist includes a pneumatic, hydraulic, or electrical actuator configured to reposition the roller vertically.

5. The apparatus of claim 3, wherein the hoist includes a connecting rod and a piston configured to reposition the roller both vertically and horizontally.

6. The apparatus of claim 1, wherein the backing is temporarily connected to the electrical raceway, and wherein the backing is disconnected from the electrical raceway after attachment of the electrical raceway to the floor grid assembly of the aircraft.

7. The apparatus of claim 1, wherein the backing is a modular pallet and is permanently connected to the electrical raceway.

8. The apparatus of claim 1, wherein the floor grid assembly is positioned in an upside-down orientation on the floor grid tooling.

9. The apparatus of claim 1, further comprising a plurality of self-aligning provisions mounted to the backing and the floor grid assembly of the aircraft.

10. The apparatus of claim 9, further comprising a metrology system configured to provide feedback on a position of the backing relative to the floor grid assembly of the aircraft such that the self-aligning provisions on the backing align with the self-aligning provisions on the floor grid assembly of the aircraft and that the backing is in the position for attachment with the floor grid assembly of the aircraft.

11. The apparatus of claim 1, wherein the hoist is a plurality of hoists evenly spaced within the floor grid tooling in a plurality of cutouts, the plurality of hoists configured to support the entire length of the backing.

12. A system for installing an electrical raceway into a floor grid assembly of an aircraft, comprising:

a floor beam connected to a set of seat tracks forming the floor grid assembly;

floor grid tooling having a horizontal beam configured to support the floor grid assembly;

an electrical raceway;

a backing connected to the electrical raceway;

a cutout in the horizontal beam sized to accommodate the backing, the backing configured to be loaded into the floor grid tooling through the cutout; and a hoist connected to the floor grid tooling and positioned within the cutout, the hoist comprising a roller for engagement with the backing.

13. The system of claim 12, wherein the hoist is a plurality of hoists evenly spaced within the floor grid tooling in a plurality of cutouts and the cutout is a first cutout of the plurality of cutouts, wherein the backing is loaded lengthwise into the floor grid tooling through the first cutout of the plurality of cutouts.

14. The system of claim 13, wherein the backing is loaded lengthwise into the floor grid tooling through the first cutout of the plurality of cutouts under the floor beam.

15. The system of claim 12, wherein the floor grid assembly of the aircraft is positioned in an upside-down orientation on the floor grid tooling.

16. The system of claim 12, further comprising a plurality of self-aligning provisions mounted to the backing and the floor grid assembly of the aircraft.

17. The system of claim 16, further comprising a metrology system configured to provide feedback on a position of the backing relative to the floor grid assembly of the aircraft such that the self-aligning provisions on the backing align with the self-aligning provisions on the floor grid assembly of the aircraft and that the backing is in the position for attachment with the floor grid assembly of the aircraft.

18. A method for installing an electrical raceway into a floor grid assembly of an aircraft, the method comprising:

loading a set of seat tracks and a set of floor beams on a floor grid tooling to form the floor grid assembly of the aircraft, wherein the floor grid tooling includes a cutout under each floor beam of the set of floor beams;

connecting an electrical raceway to a backing, wherein the backing has a length and a width;

loading the backing lengthwise into the floor grid tooling under the floor grid assembly of the aircraft through the cutout under a first floor beam of the set of floor beams; and lifting the backing and connected electrical raceway into a position for attachment with the floor grid assembly of the aircraft.

19. The method of claim 18, wherein lifting the backing and connected electrical raceway comprises lifting the backing and connected electrical raceway with a plurality of hoists, wherein a hoist of the plurality of hoists is attached to floor grid tooling at each floor beam of the set of floor beams.

20. The method of claim 18, further comprising using a metrology system to provide feedback on a position of the backing relative to the floor grid assembly of the aircraft such that self-aligning provisions on the backing align with self-aligning provisions on the floor grid assembly of the aircraft and that the backing is in the position for attachment with the floor grid assembly of the aircraft.

21. The method of claim 18, further comprising disconnecting the backing from the electrical raceway.

* * * * *